(12) United States Patent
Mountain et al.

(10) Patent No.: US 12,345,208 B2
(45) Date of Patent: Jul. 1, 2025

(54) APPARATUS FOR GENERATING ELECTRICAL ENERGY FOR AN AIRCRAFT AND AIRCRAFT

(71) Applicants: Rolls-Royce Deutschland Ltd & Co KG, Blankenfelde-Mahlow (DE); Rolls-Royce plc, London (GB)

(72) Inventors: Stephen Mountain, Derby (GB); Christian Seydel, Stahsdorf (DE); Gideon Daniel Venter, Berlin (DE); Sebastian Kopp, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 18/476,621

(22) Filed: Sep. 28, 2023

(65) Prior Publication Data

US 2024/0102420 A1 Mar. 28, 2024

(30) Foreign Application Priority Data

Sep. 28, 2022 (DE) ...................... 10 2022 124 926.3

(51) Int. Cl.
*F02C 7/32* (2006.01)
*B64D 41/00* (2006.01)
*F01D 15/10* (2006.01)

(52) U.S. Cl.
CPC ................ *F02C 7/32* (2013.01); *B64D 41/00* (2013.01); *F01D 15/10* (2013.01); *F05D 2220/76* (2013.01); *F05D 2260/4031* (2013.01)

(58) Field of Classification Search
CPC ... F02C 7/32; F02C 7/36; B64D 41/00; F01D 15/10; F05D 2220/76; F05D 2260/4031
See application file for complete search history.

(56) References Cited

U.S. PATENT DOCUMENTS 3,688,505 A * 9/1972 Dison ...................... F02C 7/04
60/268
2007/0151258 A1 7/2007 Gaines et al.
(Continued)

FOREIGN PATENT DOCUMENTS

EP 4155521 A1 * 3/2023 ............. B64D 27/10

OTHER PUBLICATIONS

German Search Report for German Application No. 10 2022 124 923.6 mailed May 15, 2023.
(Continued)

*Primary Examiner* — David P. Olynick
(74) *Attorney, Agent, or Firm* — Lempia Summerfield Katz LLC

(57) ABSTRACT

An apparatus for an aircraft includes an electric machine and a gas turbine. The gas turbine includes a compressor, a turbine unit having a high-pressure turbine and a low-pressure turbine, and a combustion chamber. The compressor is connected via a high-pressure shaft to the high-pressure turbine, and the low-pressure turbine is connected via a low-pressure shaft directly to an output shaft of the electric machine. The high-pressure shaft and the low-pressure shaft are rotatable in different directions. The electric machine is operable as a generator and may be operated as a motor to start the gas turbine. The output shaft is connected via a gear box unit and a free-wheel to the high-pressure shaft. The free-wheel separates the connection between the output shaft of the electric machine and the high-pressure shaft in the presence of a torque flow from the high-pressure shaft in a direction of the output shaft.

10 Claims, 1 Drawing Sheet

(56) References Cited

U.S. PATENT DOCUMENTS

| | | |
|---|---|---|
| 2008/0184694 A1 | 8/2008 | Guimbard |
| 2009/0193784 A1* | 8/2009 | Siden ................... F01D 15/10 |
| | | 60/39.15 |
| 2013/0219907 A1 | 8/2013 | Schwarz |
| 2018/0372005 A1 | 12/2018 | Venter |
| 2020/0386188 A1* | 12/2020 | Kupratis ................ F02C 7/32 |
| 2021/0362862 A1 | 11/2021 | Jaljal |
| 2021/0388733 A1* | 12/2021 | Valois ................... F01D 15/10 |
| 2022/0074349 A1* | 3/2022 | Valois ................... F02C 3/10 |
| 2022/0136402 A1 | 5/2022 | Baladi et al. |

OTHER PUBLICATIONS

European Search Report for European App. No. 23199771.9 mailed Feb. 15, 2024.

* cited by examiner

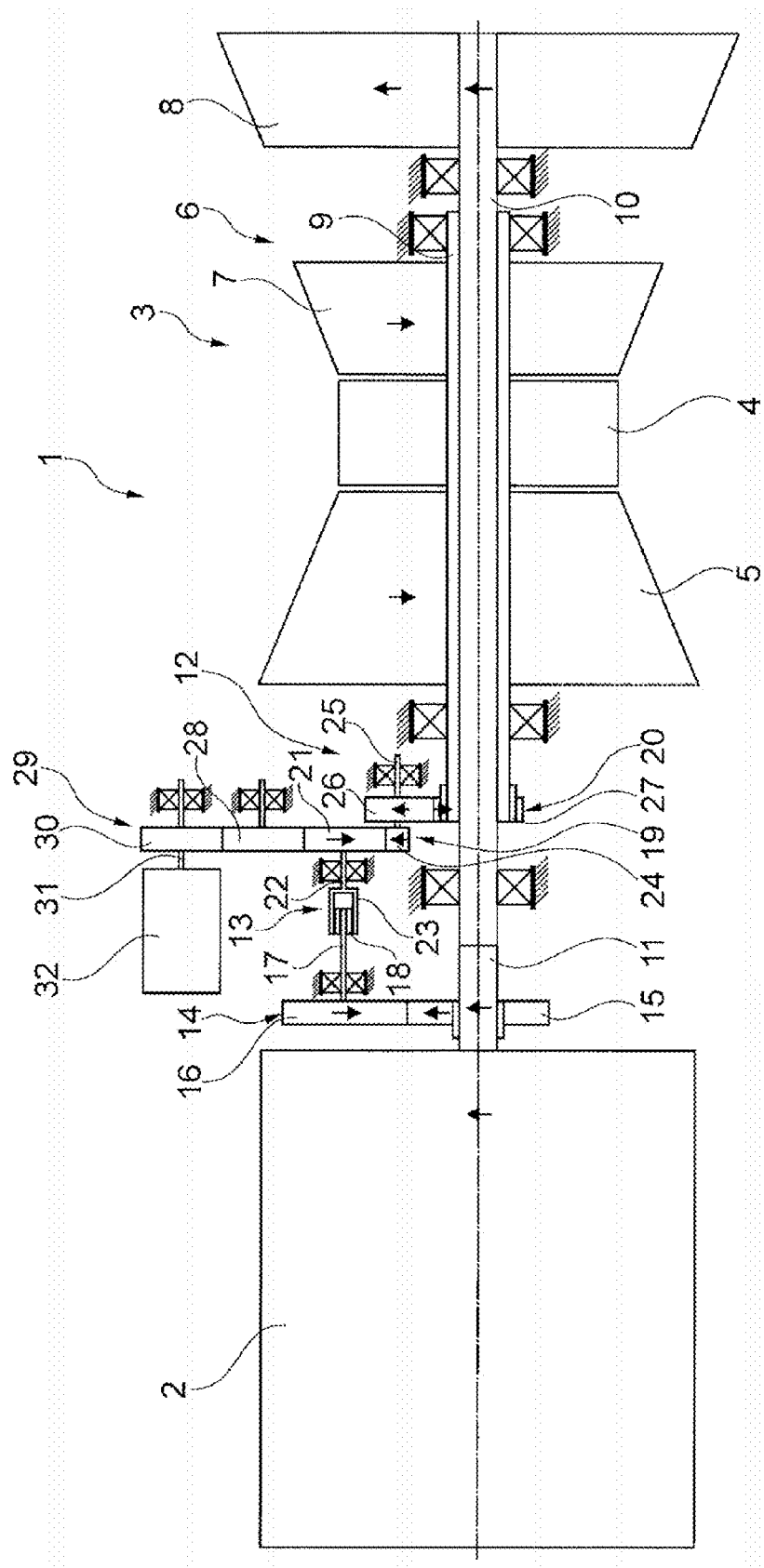

APPARATUS FOR GENERATING ELECTRICAL ENERGY FOR AN AIRCRAFT AND AIRCRAFT

This application claims the benefit of German Patent Application No. DE 10 2022 124 926.3, filed on Sep. 28, 2022, which is hereby incorporated by reference in its entirety.

BACKGROUND

The present disclosure relates to an apparatus for generating electrical energy for an aircraft, and an aircraft having such an apparatus.

In the recent past, attempts have been made to replace previous, known transport systems, the drives of which convert fossil fuels into mechanical energy during operation, increasingly with more environmentally friendly systems. This applies both to land-based vehicles and to aircraft, for which suitable environmentally compatible drive technologies are also being developed.

In addition to the purely electrical drives, hybrid drive systems also constitute efficient aircraft drive systems that emit substantially fewer pollutants than current drive systems and conserve fuel resources. As a result of the currently unfavorable relationship between weight and energy content in traction batteries, however, the purely electrical flight method is advantageous only for a very small area of application. Electric aircraft are therefore currently provided with additional energy converters and stores in order to achieve acceptable ranges and drive powers with costs that are moderate at the same time.

The hybrid electrical drive system with small energy generators for extending ranges is considered to be a drive concept capable of meeting future requirements. For use as range extenders, different concepts that allow a conversion of chemical energy into electrical energy are available. In this case, the specification of a range extender depends very powerfully on the requirements placed on future drive concepts. This provides that installation space, weight, costs, and suitability for multiple fuels acquire a weighting that is to be redefined during the selection process of the energy converter.

The development and application of alternative energy conversion concepts are currently considered to be advantageous in order, for example, to improve the range of electrically driven small aircraft. Currently known concepts include apparatuses that include a combination of a generator and a gas turbine that drives the generator.

However, the known apparatuses have a high construction space requirement and a low power density, which also has an unfavorable effect on an energy consumption of an aircraft that is configured therewith.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an apparatus for generating electrical energy for an aircraft that is favorable in terms of construction space and has a high power density, and an aircraft that has an energy consumption that is as low as possible are provided.

According to a first aspect, an apparatus for generating electrical energy for an aircraft that includes an electric machine and a gas turbine device is provided. The gas turbine device is configured with a compressor unit having a combustion chamber unit and having a turbine unit that is constructed with at least one high-pressure turbine and with a low-pressure turbine.

The compressor unit is connected via a high-pressure shaft to the high-pressure turbine while the low-pressure turbine is connected via a low-pressure shaft directly to an output shaft of the electric machine. The high-pressure shaft, the low-pressure shaft, and the output shaft of the electric machine are arranged coaxially relative to each other in an advantageous manner in terms of structural space. During operation of the gas turbine device, the high-pressure shaft and the low-pressure shaft rotate in different rotation directions. The electric machine may be operated as a generator in order to generate electrical energy and as a motor in order to start the gas turbine device, whereby the apparatus according to the present disclosure may be configured in a simple and cost-effective manner that is advantageous in terms of structural space without any additional starter unit. As a result, the apparatus has a higher power density in comparison with known apparatuses.

Additionally, the output shaft is connected via a gear box unit and a free-wheel to the high-pressure shaft. The free-wheel separates the connection between the output shaft of the electric machine and the high-pressure shaft in the presence of a torque flow from the high-pressure shaft in the direction of the output shaft.

As a result, the rotation direction reversal that is necessary for driving the high-pressure shaft by the electric machine may be constituted in the region of the gear box with little construction complexity. Additionally, the free-wheel affords the possibility, without additional control and regulation complexity, of the active connection between the electric machine and the high-pressure shaft being interrupted in the region of the free-wheel in the switched-on state of the gas turbine device, in which the high-pressure shaft rotates at a higher speed than the low-pressure shaft. Then, the electric machine may be driven by the low-pressure turbine that is connected via the low-pressure shaft and may generate electrical energy during generator operation to the desired extent without influencing the operation of the high-pressure turbine in an undesirable manner.

In a structurally simple and cost-effective embodiment of the apparatus according to the present disclosure, the gear box unit includes a first spur pinion stage with a first spur pinion that is connected to the output shaft and meshes with a second spur pinion. The second spur pinion is connected in a rotationally secure manner to a shaft that is connected to a first connection half of the free-wheel.

The gear box unit of an additional structurally simple and cost-effective embodiment of the apparatus according to the present disclosure has a second spur pinion stage and a third spur pinion stage. A first spur pinion of the second spur pinion stage is arranged on a shaft that is connected in a rotationally secure manner to a second connection half of the free-wheel.

A second spur pinion of the second spur pinion stage may be connected in a rotationally secure manner via a shaft to a first spur pinion of the third spur pinion stage in a structurally simple and cost-effective manner. The first spur pinion meshes with a second spur pinion of the third spur pinion stage that is actively connected in a rotationally secure manner to the high-pressure shaft.

If an additional gear, in the form of a spur pinion, of an auxiliary unit gear box device meshes with the first spur pinion of the second spur pinion stage, then the auxiliary unit gear box device may be driven during the start operation of the gas turbine device by the motor-operated electric machine and in the switched-on operating state of the gas turbine device via the high-pressure shaft by the high-pressure turbine.

In another embodiment of the apparatus according to the present disclosure, which has a high power density, a spur pinion, via which at least one auxiliary power unit may be driven, of the auxiliary unit gear box device engages with the gear of the auxiliary unit gear box device.

In an embodiment of the apparatus according to the present disclosure that is distinguished by a small structural space requirement in a radial direction, the gear box unit is arranged in an axial direction of the output shaft between the electric machine and the compressor unit.

Further, an aircraft that is configured with an apparatus that is constructed in the manner described in greater detail above and may therefore be operated with little energy use with a great range at the same time is provided.

A feature or parameter described in relation to one of the above aspects may be applied to any other aspect, unless these are mutually exclusive. Further, any feature or any parameter described here may be applied to any aspect and/or combined with any other feature or parameter described here, unless these are mutually exclusive.

The present disclosure is not restricted to the indicated combination of features of the additional independent claims or claims dependent thereon. There are further possibilities of combining individual features, including those that emerge from the claims, the following description of embodiments, and directly from the drawing, with one another. The reference to the drawings by the claims through the use of reference designations is not intended to restrict the scope of protection of the claims.

Refinements emerge from the dependent claims and the description hereunder. Embodiments of the subject matter according to the present disclosure are explained in greater detail with reference to the drawing, without being restricted thereto.

BRIEF DESCRIPTION OF THE DRAWING

FIG. 1 shows a highly schematic longitudinally sectioned view of an apparatus for an aircraft for generating electrical energy.

DETAILED DESCRIPTION

FIG. 1 shows one embodiment of an apparatus 1 for generating electrical energy for an aircraft, which is not illustrated in greater detail. The apparatus includes an electric machine 2 and a gas turbine device 3 that is actively connected thereto as a highly simplified longitudinally sectioned view. The gas turbine device 3 is configured with a combustion chamber unit 4, a compressor unit 5, and a turbine unit 6 that includes a high-pressure turbine 7 and a low-pressure turbine 8. In a region of the compressor unit 5, air is compressed and introduced into the combustion chamber unit 4, in which fuel is supplied to the compressed air. The fuel/air admixture is ignited in the combustion chamber unit 4. The air that is heated by the combustion is discharged in a direction of the high-pressure turbine 7, expands at that location, and drives the high-pressure turbine 7. Subsequently, the air flows through the low-pressure turbine 8 and drives the low-pressure turbine 8.

The compressor unit 5 is connected to the high-pressure turbine 7 via a high-pressure shaft 9 and is consequently driven thereby during operation of the gas turbine device 3. The low-pressure turbine 8 is directly connected via a low-pressure shaft 10 to an output shaft 11 of the electric machine 2 and therefore drives the electric machine 2 in the switched-on state of the gas turbine device 3. The electric machine 2 generates electrical energy during generator operation and supplies electrical energy to an electrical aircraft drive of an aircraft, and may also act on an on-board network and an electrical storage unit of the aircraft with electrical energy.

The high-pressure shaft 9, the low-pressure shaft 10, and the output shaft 11 of the electric machine 2 are arranged coaxially relative to each other. In this case, the high-pressure shaft 9 and the low-pressure shaft 10 rotate during operation of the gas turbine device 3 with different rotation directions. For this reason, the turbine unit 6 may be operated with a high degree of efficiency.

The electric machine 3 may also be operated as a motor in order to start the gas turbine device 3. In order to start the gas turbine device 3, the output shaft 11 is connected to the high-pressure shaft 9 via a gear box unit 12 and a free-wheel 13. The gear box unit 12 is arranged in an axial direction of the output shaft 11 between the electric machine 2 and the compressor unit 5. The free-wheel 13 separates the connection between the output shaft 11 of the electric machine 2 and the high-pressure shaft 9 in the presence of a torque flow from the high-pressure shaft 9 in the direction of the output shaft 11.

The gear box unit 12 includes a first spur pinion stage 14 that has a first spur pinion 15 that is connected to the output shaft 11 and meshes with a second spur pinion 16 of the first spur pinion stage 14. The second spur pinion 16 of the first spur pinion stage 14 is connected in a rotationally secure manner to a shaft 17 that is connected to a first connection half 18 of the free-wheel 13. The gear box unit 12 further has a second spur pinion stage 19 and a third spur pinion stage 20. A first spur pinion 21 of the second spur pinion stage 19 is arranged on a shaft 22 that is connected in a rotationally secure manner to a second connection half 23 of the free-wheel 13.

A second spur pinion 24 of the second spur pinion stage 19 is connected in a rotationally secure manner via a shaft 25 to a first spur pinion 26 of the third spur pinion stage 20. The first spur pinion 26 of the third spur pinion stage 20 meshes with a second spur pinion 27 of the third spur pinion stage 20 that is actively connected in a rotationally secure manner to the high-pressure shaft 7.

Further, an additional gear 28 (e.g., in the form of a spur pinion) of an auxiliary unit gear box device 29 meshes with the first spur pinion 21 of the second spur pinion stage 19. A spur pinion 30 of the auxiliary unit gear box device 29 that is arranged in a rotationally secure manner on a shaft 31 of an auxiliary power unit 32 engages with the gear 28 of the auxiliary unit gear box device 29, via which shaft 31 the auxiliary power unit 32 may be driven by the high-pressure shaft 9. The auxiliary power unit 32 may, for example, be in the form of a fuel pump, hydraulic pump, or the like.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An apparatus for generating electrical energy for an aircraft, the apparatus comprising:
an electric machine; and
a gas turbine device comprising:
a compressor unit;
a turbine unit comprising at least one high-pressure turbine and a low-pressure turbine; and
a combustion chamber unit,
wherein the compressor unit is connected via a high-pressure shaft to the high-pressure turbine,
wherein the low-pressure turbine is connected via a low-pressure shaft directly to an output shaft of the electric machine,
wherein the high-pressure shaft, the low-pressure shaft, and the output shaft of the electric machine are arranged coaxially relative to each other,
wherein, during operation of the gas turbine device, the high-pressure shaft and the low-pressure shaft are configured to rotate in different rotation directions, and the low-pressure shaft and the output shaft are configured to rotate together in a same rotation direction,
wherein the electric machine is operable as a generator, such that the electrical energy is generated,
wherein the electric machine is operable as a motor, such that the electric machine is configured to start the gas turbine device with the high-pressure shaft, and the low-pressure shaft and the output shaft rotating in the different rotation directions, and the output shaft is connected via a gear box unit and a free-wheel to the high-pressure shaft,
wherein the free-wheel separates a connection between the output shaft of the electric machine and the high-pressure shaft in a presence of a torque flow from the high-pressure shaft in a direction of the output shaft,
wherein the gear box unit comprises a first spur pinion stage, the first spur pinion stage comprising a first spur pinion that is connected to the output shaft in a rotationally secure manner and meshes with a second spur pinion of the first spur pinion stage,
wherein the second spur pinion is connected in a rotationally secure manner to a shaft that is connected to a first connection half of the free-wheel,
wherein the gear box unit further comprises a second spur pinion stage and a third spur pinion stage,
wherein a first spur pinion of the second spur pinion stage is arranged in a rotationally secure manner on a shaft that is connected in a rotationally secure manner to a second connection half of the free-wheel, and
wherein a second spur pinion of the second spur pinion stage is connected in a rotationally secure manner via a shaft to a first spur pinion of the third spur pinion stage, such that the second spur pinion of the second spur pinion stage and the first spur pinion of the third spur pinion stage rotate in a same rotational direction.

2. The apparatus of claim 1,
wherein the first spur pinion of the third spur pinion stage meshes with a second spur pinion of the third spur pinion stage, and
wherein the second spur pinion of the third spur pinion stage is actively connected in a rotationally secure manner to the high-pressure shaft.

3. The apparatus of claim 1, wherein an additional gear of an auxiliary unit gear box device meshes with the first spur pinion of the second spur pinion stage, the additional gear being in the form of a spur pinion.

4. The apparatus of claim 3, wherein another spur pinion of the auxiliary unit gear box device engages with the additional gear of the auxiliary unit gear box device,
wherein the other spur pinion is arranged in a rotationally secure manner on a shaft of an auxiliary power unit, via which the auxiliary power unit is drivable by the high-pressure shaft.

5. The apparatus of claim 1, wherein the gear box unit is arranged in an axial direction of the output shaft between the electric machine and the compressor unit.

6. An aircraft comprising:
an apparatus for generating electrical energy for the aircraft, the apparatus comprising:
an electric machine; and
a gas turbine device comprising:
a compressor unit;
a turbine unit comprising at least one high-pressure turbine and a low-pressure turbine; and
a combustion chamber unit,
wherein the compressor unit is connected via a high-pressure shaft to the high-pressure turbine,
wherein the low-pressure turbine is connected via a low-pressure shaft directly to an output shaft of the electric machine,
wherein the high-pressure shaft, the low-pressure shaft, and the output shaft of the electric machine are arranged coaxially relative to each other,
wherein, during operation of the gas turbine device, the high-pressure shaft and the low-pressure shaft are configured to rotate in different rotation directions, and the low-pressure shaft and the output shaft are configured to rotate together in a same rotation direction,
wherein the electric machine is operable as a generator, such that the electrical energy is generated,
wherein the electric machine is operable as a motor, such that the electric machine is configured to start the gas turbine device with the high-pressure shaft, and the low-pressure shaft and the output shaft rotating in the different rotation directions, and the output shaft is connected via a gear box unit and a free-wheel to the high-pressure shaft,
wherein the free-wheel separates a connection between the output shaft of the electric machine and the high-pressure shaft in a presence of a torque flow from the high-pressure shaft in a direction of the output shaft,
wherein the gear box unit comprises a first spur pinion stage, the first spur pinion stage comprising a first spur pinion that is connected to the output shaft in a rotationally secure manner and meshes with a second spur pinion of the first spur pinion stage,
wherein the second spur pinion is connected in a rotationally secure manner to a shaft that is connected to a first connection half of the free-wheel,
wherein the gear box unit further comprises a second spur pinion stage and a third spur pinion stage,
wherein a first spur pinion of the second spur pinion stage is arranged in a rotationally secure manner on a shaft that is connected in a rotationally secure manner to a second connection half of the free-wheel, and wherein a second spur pinion of the second spur pinion stage is connected in a rotationally secure manner via a shaft to a first spur pinion of the third spur pinion stage, such that the second spur pinion of the second spur pinion stage and the first spur pinion of the third spur pinion stage rotate in a same rotational direction.

7. The aircraft of claim 6,
wherein the first spur pinion of the third spur pinion stage meshes with a second spur pinion of the third spur pinion stage, and
wherein the second spur pinion of the third spur pinion stage is actively connected in a rotationally secure manner to the high-pressure shaft.

8. The aircraft of claim 6, wherein an additional gear of an auxiliary unit gear box device meshes with the first spur pinion of the second spur pinion stage, the additional gear being in the form of a spur pinion.

9. The aircraft of claim 8, wherein another spur pinion of the auxiliary unit gear box device engages with the additional gear of the auxiliary unit gear box device,
wherein the other spur pinion is arranged in a rotationally secure manner on a shaft of an auxiliary power unit, via which the auxiliary power unit is drivable by the high-pressure shaft.

10. The aircraft of claim 6, wherein the gear box unit is arranged in an axial direction of the output shaft between the electric machine and the compressor unit.

\* \* \* \* \*